(12) United States Patent
Park et al.

(10) Patent No.: US 10,057,147 B2
(45) Date of Patent: Aug. 21, 2018

(54) APPARATUS AND METHOD FOR CONTROLLING DATA FLOW IN COMMUNICATION SYSTEM

(71) Applicants: Samsung Electronics Co., Ltd., Suwon-si (KR); Seoul National University R&DB Foundation, Seoul (KR)

(72) Inventors: Se-Yong Park, Seoul (KR); Sae-Woong Bahk, Seoul (KR); Chang-Hee Joo, Ulsan (KR); Yong-Seok Park, Seoul (KR); Do-Jun Byun, Seoul (KR); Chul-Ho Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 296 days.

(21) Appl. No.: 14/866,593

(22) Filed: Sep. 25, 2015

(65) Prior Publication Data

US 2016/0094465 A1   Mar. 31, 2016

(30) Foreign Application Priority Data

Sep. 26, 2014 (KR) .................. 10-2014-0129057

(51) Int. Cl.
| | |
|---|---|
| *H04L 12/26* | (2006.01) |
| *H04L 12/807* | (2013.01) |
| *H04L 12/841* | (2013.01) |
| *H04L 12/801* | (2013.01) |

(52) U.S. Cl.
CPC ........ *H04L 43/0829* (2013.01); *H04L 43/026* (2013.01); *H04L 43/0864* (2013.01); *H04L 47/27* (2013.01); *H04L 47/283* (2013.01); *H04L 47/34* (2013.01)

(58) Field of Classification Search
CPC ....... H04L 47/27; H04L 47/283; H04L 47/34; H04L 43/0829; H04L 43/0864
See application file for complete search history.

(56) References Cited

U.S. PATENT DOCUMENTS

| | | | |
|---|---|---|---|
| 2007/0076726 A1 | 4/2007 | Weston | |
| 2009/0268747 A1* | 10/2009 | Kurata | H04L 1/1832 370/412 |
| 2010/0008223 A1* | 1/2010 | Messing | H04L 1/1825 370/231 |
| 2010/0027424 A1* | 2/2010 | Radunovic | H04W 40/04 370/238 |
| 2012/0120805 A1* | 5/2012 | Maze | H04L 1/1835 370/235 |

(Continued)

*Primary Examiner* — Paul H Masur
(74) *Attorney, Agent, or Firm* — McAndrews, Held & Malloy, Ltd.

(57) ABSTRACT

Provided is an apparatus for controlling a data flow for multiple paths in a receiving node of a communication system. The apparatus includes a receiver configured to receive data for a specific sub-flow among a plurality of sub-flows; a controller configured to calculate an optimal transmission rate of the received data, determine a window reference value for generating the optimal transmission rate, and generate an artificial response message if a window size for the specific sub-flow is greater than or equal to the window reference value; and a transmitter configured to transmit the artificial response message to a transmitting node.

18 Claims, 5 Drawing Sheets

(56) References Cited

U.S. PATENT DOCUMENTS

| | | | |
|---|---|---|---|
| 2012/0226802 A1* | 9/2012 | Wu | H04L 1/1825 709/224 |
| 2013/0044595 A1* | 2/2013 | Han | H04W 28/0242 370/230 |
| 2013/0336213 A1* | 12/2013 | Mimura | H04W 40/00 370/328 |
| 2014/0050095 A1* | 2/2014 | Szilagyi | H04L 1/0002 370/236 |
| 2015/0271042 A1* | 9/2015 | Thapliya | H04L 47/11 370/253 |
| 2016/0294714 A1* | 10/2016 | Persson | H04L 47/12 |

* cited by examiner

APPARATUS AND METHOD FOR CONTROLLING DATA FLOW IN COMMUNICATION SYSTEM

RELATED APPLICATION(S)

This application claims the benefit under 35 U.S.C. § 119(a) of a Korean patent application filed in the Korean Intellectual Property Office on Sep. 26, 2014 and assigned Serial No. 10-2014-0129057, the entire disclosure of which is incorporated herein by reference.

BACKGROUND

The present disclosure relates to an apparatus and method for controlling data flows for multiple paths in a communication system.

A transmission control protocol (TCP) is a transmission protocol that is used for non-real-time services such as a hyper text transfer protocol (HTTP) for web browsing, a file transfer protocol (FTP) and an Internet message access protocol (IMAP), and real-time services such as a multimedia streaming service. The TCP may be established between a client (e.g., a user equipment (UE)) and a server to perform retransmission, flow control and congestion control for data in order to improve the reliability of the Internet protocol (IP) layer.

For a flow control, a receiving node may control a transmitting node so as to transmit only the data, the amount of which corresponds to a capacity of a buffer. Therefore, the transmitting node may dynamically adjust its transmission rate depending on an acknowledgement transmitted from the receiving node. For a congestion control, the transmitting node may use a supplied window with the size that the receiving node has for the buffer in order to determine a congestion window (CW) controlled by slow start and congestion control algorithm and to determine the amount of data that the transmitting node can transmit.

Recently, due to an increase in terminals with multiple interfaces such as wideband code division multiple access (WCDMA), long term evolution (LTE) and wireless fidelity (Wi-Fi), the importance of a multipath transmission control protocol (MPTCP), which allows a transport layer to recognize and utilize a plurality of network links, has been highlighted.

The MPTCP is a multipath technology, the standardization of which has recently been completed by Internet Engineering Task Force (IETF). Such multipath technology may also be used to configure a multipath TCP session by configuring a plurality of sub-flows at the same time using multiple network addresses between communication nodes.

As to the characteristics of the MPTCP, since the MPTCP is configured based on the TCP, the MPTCP may basically supports the TCP. However, if a TCP flow control method is applied to an MPTCP flow control method, the TCP flow control method can only control the data flow for each path, but cannot control the data flows for multiple paths at the same time.

Therefore, there is a need for a method for efficiently controlling the data flows for multiple paths at the same time in the MPTCP.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to address at least the above-mentioned problems and/or disadvantages and to provide at least the advantages described below. Accordingly, an aspect of the present disclosure is to provide an apparatus and method for controlling data flows for multiple paths in a communication system.

Another aspect of the present disclosure is to provide a data flow control apparatus and method for minimizing the time delay occurring between a transmitting node and a receiving node in a communication system.

Another aspect of the present disclosure is to provide a data flow control apparatus and method for determining an optimal transmission rate in a receiving node of a communication system.

In accordance with an aspect of the present disclosure, there is provided an apparatus for controlling a data flow in a receiving node of a communication system. The apparatus may include a receiver configured to receive data for a specific sub-flow among a plurality of sub-flows; a controller configured to calculate an optimal transmission rate of the received data, determine a window reference value for generating the optimal transmission rate, and generate an artificial response message if a window size for the specific sub-flow is greater than or equal to the window reference value; and a transmitter configured to transmit the artificial response message to a transmitting node.

In accordance with another aspect of the present disclosure, there is provided a method for controlling a data flow in a receiving node of a communication system. The method may include receiving data for a specific sub-flow among a plurality of sub-flows; calculating an optimal transmission rate of the received data, determining a window reference value for generating the optimal transmission rate, and generating an artificial response message if a window size for the specific sub-flow is greater than or equal to the window reference value; and transmitting the artificial response message to a transmitting node.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be optional for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As regards the subject matter of the present disclosure, in order to transmit and receive data at an optimal transmission rate that minimizes the time delay occurring between a transmitting node and a receiving node in a communication system, the receiving node transmits an artificial duplicated acknowledge (dupACK) message to the transmitting node, at a window reference value that can generate the optimal transmission rate.

An apparatus and method for controlling a data flow in a communication system according to an embodiment of the present disclosure will be described in detail.

Figure 1:
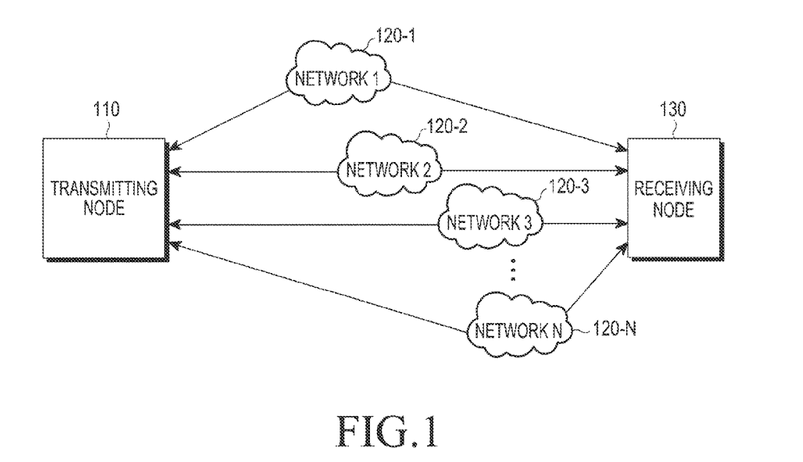
FIG. 1 illustrates a multipath communication system to which the present disclosure is applicable.

FIG. 1 illustrates a multipath communication system to which the present disclosure is applicable.

Referring to FIG. 1, a transmitting node 110 and a receiving node 130 may be connected to each other through a plurality of networks 120-1 to 120-N. Each of the plurality of networks 120-1 to 120-N may be a wired or wireless network that transmits or receives data depending on an interface used in a transmitting node 110 and a receiving node 130.

The transmitting node 110 and the receiving node 130 may establish a plurality of TCP sessions using a plurality of network addresses, and may be connected to a plurality of sub-flows through their associated TCP sessions to transmit or receive data to/from each other. In other words, if transmitting data through a plurality of sub-flows, the transmitting node 110 may set a window size for each sub-flow, and transmit data to the receiving node 130 in the set window size, thereby controlling congestion for each sub-flow. The receiving node 130 may transmit, to the transmitting node 110, an acknowledge (ACK) message or a dupACK message as a response message for the data received from the transmitting node 110, and rearrange the received data if the transmitted response message is an ACK message.

During the time (i.e., a round trip time (RTT)) in which the transmitting node 110 and the receiving node 130 transmit data through one sub-flow and receive a response thereto, a time delay may occur due to the operations performed in the transmitting node 110, the first network 120-1 and the receiving node 130.

In other words, in the transmitting node 110, a buffer queuing time delay may occur during the time in which data for a specific sub-flow is generated and input to a buffer before the transmitting node 110 transmits data for the specific sub-flow. In the first network 120-1, network time delay may occur, since the first network 120-1 transmits the data received from the transmitting node 110 to the receiving node 130 depending on the transmission bandwidth and transmission rate of the network. In the receiving node 130, a rearrangement time delay may occur, during which the receiving node 130 checks a sub-flow to which the received data corresponds, and rearranges the received data for each sub-flow.

However, in the real-time services such as the multimedia streaming service, when data is provided to the user, time delay during transmission of the data should be minimized, for the stability and reliability of the data.

Accordingly, an aspect of an embodiment of the present disclosure is to provide a data flow control apparatus and method for minimizing the time delay occurring between the transmitting node 110 and the receiving node 130 in the communication system in which data for a real-time service is transmitted and received through MPTCP.

Figure 2:
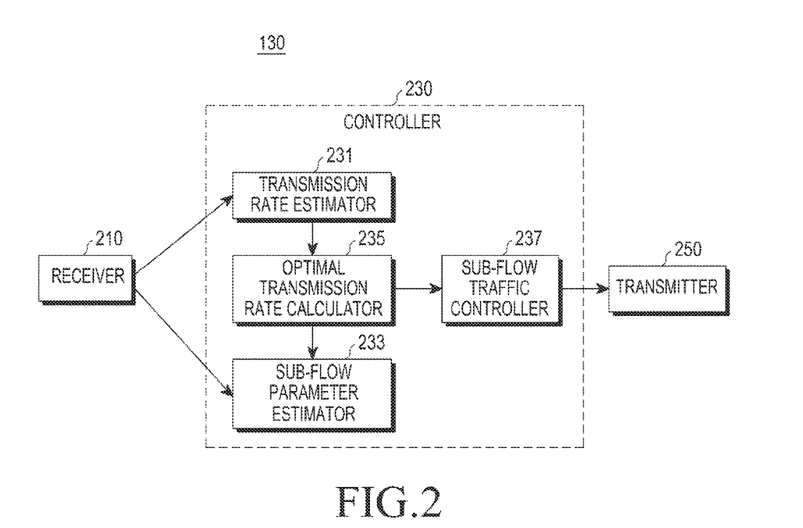
FIG. 2 illustrates a device for controlling a data flow in a receiving node of a communication system according to an embodiment of the present disclosure.

FIG. 2 illustrates a device for controlling a data flow in a receiving node 130 of a communication system according to an embodiment of the present disclosure. The receiving node 130 shown in FIG. 2 is a device that is included in a TCP layer.

Referring to FIG. 2, the receiving node 130 may include a receiver 210, a controller 230 and a transmitter 250, and the controller 230 may include a transmission rate estimator 231, a sub-flow parameter estimator 233, an optimal transmission rate calculator 235 and a sub-flow traffic controller 237.

The receiver 210 may receive data from the transmitting node 110 for each sub-flow.

The controller 230 may determine whether the received data is mapped to a sequence number of a specific sub-flow. If the received data is not mapped to the sequence number of the specific sub-flow, the controller 230 may generate a dupACK message, and control the transmitter 250 so as to transmit the generated dupACK message to the transmitting node 110. On the other hand, if the received data is mapped to a sequence number of a specific sub-flow, the controller 230 may generate an ACK message, and control the transmitter 250 so as to transmit the generated ACK message to the transmitting node 110.

In particular, if the received data is mapped to a sequence number of a specific sub-flow, the controller 230 according to an embodiment of the present disclosure may control the data flow so that the data may be transmitted through the specific sub-flow at an optimal transmission rate. As used herein, the optimal transmission rate refers to a transmission rate for minimizing a time delay for the data that is transmitted through a specific sub-flow among a plurality of sub-flows formed between the transmitting node 110 and the receiving node 130. It will be assumed herein that the specific sub-flow is an r-th sub-flow among the plurality of sub-flows.

Specifically, the controller 230 may perform the following operations in order to control the data flow so that the data may be transmitted through the specific sub-flow at an optimal transmission rate.

The transmission rate estimator 231 included in the controller 230 may estimate a transmission rate 'f' of an application layer of the transmitting node 110. The transmission rate estimator 231 may estimate a transmission rate 'f' of an application layer of the transmitting node 110, or if the received data is media streaming data, the transmission rate estimator 231 may estimate a transmission rate based on the amount of backlogged data stored in a playback buffer (not shown).

The sub-flow parameter estimator 233 may measure or estimate path information for a sub-flow #r in order to estimate a transmission rate for the sub-flow #r. The path information for the sub-flow #r may include at least one of a round trip time (RTT) $rtt_r$, a packet loss rate $q_r$, a window size $w_r$, a path's capacity $c_r$ (i.e., bandwidth) and a bandwidth-delay product $W_r^{BDP}$.

Specifically, the sub-flow parameter estimator 233 may measure the $rtt_r$ and the packet loss rate $q_r$ based on the data transmission/reception time between the transmitting node 110 and the receiving node 130 and the number of transmitted/received data packets, for the sub-flow #r. Further, based on the measured $rtt_r$ and $q_r$, the sub-flow parameter estimator 233 may estimate the window size $w_r$, capacity $c_r$, and bandwidth-delay product $W_r^{BDP}$ of the transmitting node 110 for the sub-flow #r. In other words, the sub-flow parameter estimator 233 may estimate the window size $w_r$ of the transmitting node 110 by counting the number of data packets received during the $rtt_r$, and if the $rtt_r$ is greater than the minimum rtt, the sub-flow parameter estimator 233 may estimate the capacity $c_r$ using Equation (1) below. The minimum rtt refers to the shortest RTT among the RTTs for all paths.

$$c_r = w_r / rtt_r \quad (1)$$

Further, the sub-flow parameter estimator 233 may estimate the bandwidth-delay product $W_r^{BDP}$ of a path for the sub-flow #r using Equation (2) below.

$$W_r^{BDP} = c_r * \text{minimum rtt} \quad (2)$$

The optimal transmission rate calculator 235 may calculate an optimal transmission rate for minimizing the time delay in data transmission between the transmitting node 110 and the receiving node 130, for each sub-flow. The optimal transmission rate of data transmission for the sub-flow #r may be represented as a function of the transmission rate 'f' provided from the transmission rate estimator 231 and the capacity $c_r$ provided from the sub-flow parameter estimator 233. Specifically, the optimal transmission rate calculator 235 may calculate the maximum transmission rate in the following order.

First, the optimal transmission rate calculator 235 may calculate a time delay of data transmission through the sub-flow #r between the transmitting node 110 and the receiving node 130, using Equation (3) below.

$$E\left[T^e(\vec{x})\right] = E\left[T^s(\vec{x})\right] + E\left[T_r^n(\vec{x})\right] + E\left[T_r^o(\vec{x})\right] = E\left[T^s(\vec{x})\right] + \max_{r \in R_s} E\left[T_r^n(\vec{x})\right] \quad (3)$$

In Equation (3), $E[T^s(\hat{\vec{x}})]$ represents a time delay occurring in the transmitting node 110, $E[T_r^n(\hat{\vec{x}})]$ represents a time delay occurring in the network corresponding to the sub-flow #r, and $E[T_r^o(\hat{\vec{x}})]$ represents a time delay occurring in the receiving node 130.

The optimal transmission rate for minimizing the time delay of data transmission through the sub-flow #r between the transmitting node 110 and the receiving node 130 may be calculated using Equation (4) below.

$$x_r^* = \operatorname{argmin} E\left[T^e(\vec{x})\right] = \operatorname{argmin}\left\{E\left[T^s(\vec{x})\right] + \max_{r \in R_s} E\left[T_r^n(\vec{x})\right]\right\} \quad (4)$$

It will be assumed herein that a packet arrival rate of an application layer corresponds to general distribution and a time delay occurring in the network has an M/M/1 queuing time delay. As used herein, the M/M/1 queuing time delay means that the rate, at which a packet arrives at a queue and leaves the queue, follows the Poisson distribution.

Further, Equation (4) may be written as Equation (5) below, if it is represented as a function of the transmission rate 'f' provided from the transmission rate estimator 231 and the capacity $c_r$ provided from the sub-flow parameter estimator 233.

$$x_r^* = \operatorname*{argmin}_{r \in R_s}\left[\left(\frac{1}{\sum \hat{x}_r - m_f}\right)\left(\frac{1 + (\sigma_f / m_f)^2}{2}\right) + \max_{r \in R_s} \frac{c_\gamma T_\gamma^s}{c_\gamma - \hat{x}_\gamma}\right] \quad (5)$$

Next, the optimal transmission rate calculator 235 may calculate a transmission rate $x_r^*$ corresponding to the packet loss rate $q_r$ for the sub-flow #r, which is applied to Equation (5), as follows.

An MPTCP-linked increase algorithm proposed in the standard may have an increase in a transmission window per unit RTT in Equation (6) below.

$$\alpha_k(t) = \frac{w_k(t)\max_{r \in R_s} w_\gamma(t)/(T_\gamma(t))^2}{\left(\sum_{r \in R_s} w_r(t)/T_r(t)\right)^2} = \frac{w_k(t) x_b(t)/T_b(t)}{\left(\sum_{r \in R_s} x_r(t)\right)^2}, \quad (6)$$

If the size of the transmission window is less than the bandwidth-delay product, the optimal transmission rate calculator 235 may calculate a transmission rate $\hat{x}_r$, 1 corresponding to the packet loss rate $q_r$ using Equation (7) below, and if the size of the transmission window is greater than the bandwidth-delay product, the optimal transmission rate calculator 235 may calculate a transmission rate $\hat{x}_r$, 2 using Equation (8) below.

$$\hat{x}_{r,1} = \frac{\sum_{t \in T_{r1}} w_r(t)}{T_{r,1}} \quad (7)$$

$$= \frac{\sum_{i=1}^{n_{r,1}} \left( w_r(t_0) + \sum_{j=0}^{i-1} \alpha_{r,1}(w_r(t_j)) \right)}{T_{r,1}}$$

$$= \begin{cases} \dfrac{\sum_{i=1}^{n_{k,1}} \beta W_{loss} + \sum_{i=1}^{n_{k,1}} \sum_{j=0}^{i-1} \alpha_{k,1}(w_k(t_j))}{n_{k,1} T_k^p}, & \text{if } r = k \\ \dfrac{\sum_{i=1}^{n_{b,1}} W_{min} + \sum_{i=1}^{n_{b,1}} \sum_{j=0}^{i-1} \alpha_{b,1}(w_b(t_j))}{n_{b,1} T_b^p}, & \text{if } r = b. \end{cases}$$

$$\hat{x}_{r,2} = c_r. \quad (8)$$

Through Equation (7) and Equation (8), the transmission rate $\hat{x}_r$ corresponding to the packet loss rate qr for the sub-flow #r may be represented as shown in Equation (9) below.

$$\hat{x}_r = \frac{T_{r,1}}{T_{r,1} + T_{r,2}} \hat{x}_{r,1} + \frac{T_{r,2}}{T_{r,1} + T_{r,2}} \hat{x}_{r,2}. \quad (9)$$

Therefore, the optimal transmission rate calculator 235 may calculate an optimal transmission rate $X_r^*$ for the sub-flow #r and an optimal packet loss rate $q_r^*$ for obtaining the optimal transmission rate $X_r^*$, based on Equation (5) and Equation (9). In general, the optimal packet loss rate $q_r^*$ may have a value lower than that of the packet loss rate in the existing MPTCP. Accordingly, if an artificial dupACK message is generated in the window size for the optimal packet loss rate $q_r^*$, the packet loss rate between the transmitting node 110 and the receiving node 130 may be decreased and the optimal transmission rate $x_r^*$ may be achieved in the long-term average. Accordingly, the optimal transmission rate calculator 235 may determine the window size for the optimal packet loss rate $q_r^*$ as a window reference value $W_r^{loss}$.

If the window size $w_r$ estimated by the sub-flow parameter estimator 233 is greater than or equal to the window reference value $W_r^{loss}$, the sub-flow traffic controller 237 may generate an artificial dupACK message, and control the transmitter 250 so as to transmit the generated artificial dupACK message to the transmitting node 110. On the other hand, if the window size $w_r$ is less than the window reference value $W_r^{loss}$, the sub-flow traffic controller 237 may generate a general ACK message, and control the transmitter 250 so as to transmit the generated general ACK message to the transmitting node 110.

The transmitter 250 may transmit the artificial dupACK message or the general ACK message to the transmitting node 110 under control of the sub-flow traffic controller 237.

Figure 3:
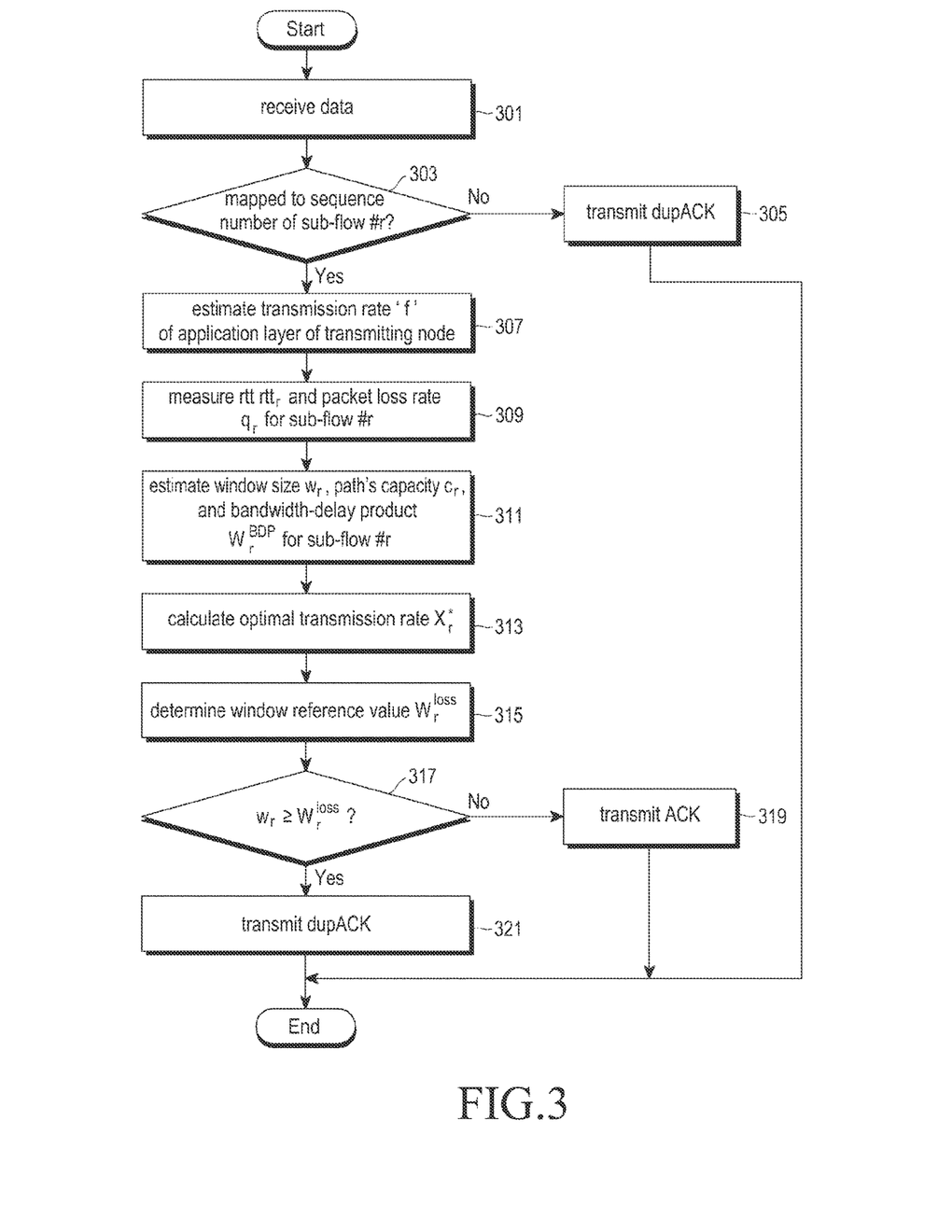
FIG. 3 illustrates a method for controlling a data flow in a receiving node of a communication system according to an embodiment of the present disclosure.

FIG. 3 illustrates a method for controlling a data flow in a receiving node 130 of a communication system according to an embodiment of the present disclosure.

Referring to FIG. 3, the receiver 210 may receive data from the transmitting node 110 for each sub-flow in operation 301. The controller 230 may determine in operation 303 whether the received data is mapped to a sequence number of a specific sub-flow #r. If the received data is not mapped to the sequence number of the sub-flow #r, the controller 230 may transmit dupACK to the transmitting node 110 through the transmitter 250 in operation 305.

On the other hand, if the received data is mapped to the sequence number of the sub-flow #r, the controller 230 may estimate or measure a transmission rate 'f' of an application layer of the transmitting node 110 in operation 307. In order to estimate the transmission rate for the sub-flow #r, the controller 230 may estimate or measure path information for the sub-flow #r in operation 309. The path information for the sub-flow #r may include at least one of a round trip time (RTT) $rtt_r$, a packet loss rate $q_r$, a window size $w_r$, a capacity $c_r$ and a bandwidth-delay product $W_r^{BDP}$. Specifically, in operation 311, the controller 230 may measure the $rtt_r$ and the packet loss rate $q_r$ based on the data transmission/reception time between the transmitting node 110 and the receiving node 130 and the number of transmitted/received data packets, for the sub-flow #r, and estimate the window size $w_r$ by counting the number of data packets received during the $rtt_r$. If the $rtt_r$ is greater than the minimum RTT, the controller 230 may estimate the capacity $c_r$ using Equation (1), and estimate the bandwidth-delay product $W_r^{BDP}$ using Equation (2).

In operation 313, the controller 230 may calculate an optimal transmission rate $X_r^*$ for the sub-flow #r, using Equation (5) that is represented as a function of the transmission rate 'f' of the application layer and the path information.

In operation 315, the controller 230 may calculate an optimal packet loss rate $q_r^*$ that is substituted in Equation (5), using Equation (9), and determine a window size for the calculated optimal packet loss rate $q_r^*$, as a window reference value $W_r^{loss}$.

The controller 230 may determine in operation 317 whether the window size $w_r$ estimated for the sub-flow #r is greater than or equal to the window reference value $W_r^{loss}$. If it is determined that the window size $w_r$ estimated for the sub-flow #r is greater than or equal to the window reference value $W_r^{loss}$, the controller 230 may generate an artificial dupACK message, and control the transmitter 250 so as to transmit the generated artificial dupACK message to the transmitting node 110, in operation 321. On the other hand, if the window size $w_r$ is less than the window reference value $W_r^{loss}$, the controller 230 may generate a general ACK message, and control the transmitter 250 so as to transmit the generated general ACK message to the transmitting node 110, in operation 319.

Therefore, since the optimal packet loss rate $q_r^*$ generally has a value lower than that of the packet loss rate in the existing MPTCP, if the receiving node 130 transmits an artificial dupACK message to the transmitting node 110 in the window size for the optimal packet loss rate $q_r^*$, it is possible to decrease the packet loss rate and achieve the optimal transmission rate $x_r^*$ in the long-term average, during data transmission/reception between the transmitting node 110 of FIG. 1 and the receiving node 130 of FIG. 1.

Figure 4:
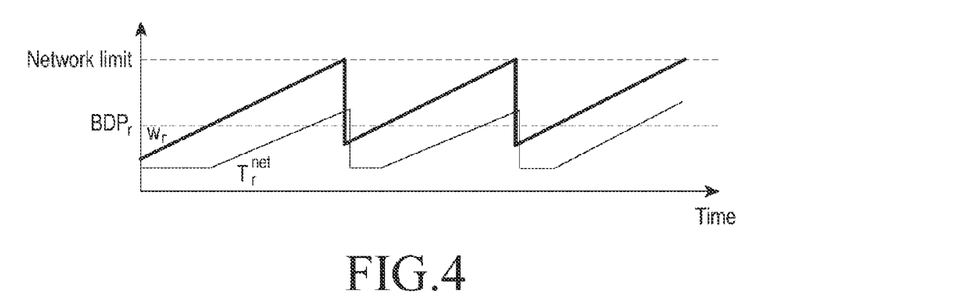
FIG. 4 illustrates a window size and a network delay over time in a conventional multipath transmission control protocol (MPTCP)
Figure 5:
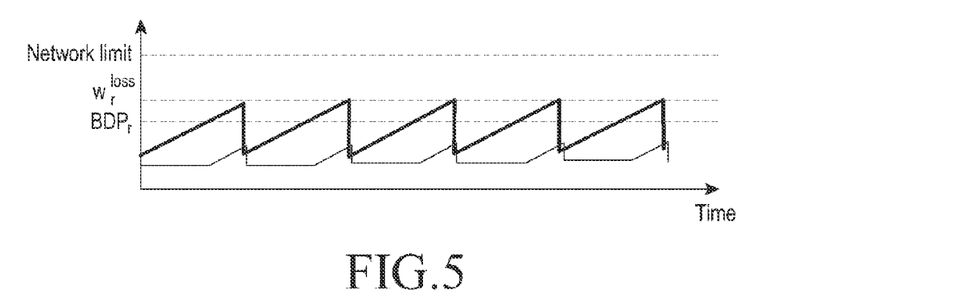
FIG. 5 illustrates a window size and a network delay over time in the MPTCP according to an embodiment of the present disclosure.

FIG. 4 illustrates a window size and a network delay over time in the conventional MPTCP, and FIG. 5 illustrates a window size and a network delay over time in the MPTCP according to an embodiment of the present disclosure.

Referring to FIG. 4, it can be seen that during data transmission/reception between a transmitting node and a receiving node in the conventional MPTCP, the network time delay is increased as a queuing delay occurs in an interval with a bandwidth-delay product $BDP_r$ for the sub-flow #r. However, referring to FIG. 5, it can be seen that if the receiving node generates an artificial dupACK at a window size value less than the network limit value at which a packet loss actually occurs, according to an embodiment of the present disclosure, the network time delay is shorter than the conventional network time delay.

Figure 6:
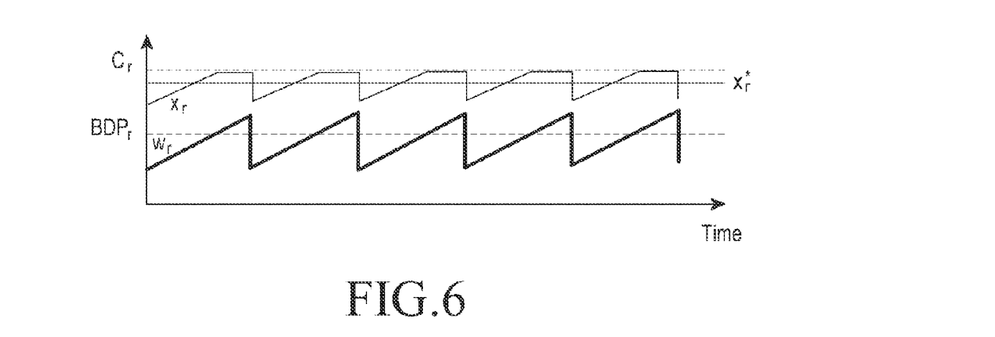
FIG. 6 illustrates a window size and a transmission rate over time in the MPTCP according to an embodiment of the present disclosure.

FIG. 6 illustrates a window size and a transmission rate over time in the MPTCP according to an embodiment of the present disclosure.

Referring to FIG. 6, after an artificial dupACK according to an embodiment of the present disclosure is generated, the transmission rate $x_r$ may be temporarily decreased, and if the window size $w_r$ for the sub-flow #r is greater than the bandwidth-delay product $BDP_r$, the transmission rate $x_r$ may converge in the capacity $c_r$. Despite the change in the transmission rate, the data flow control method according to an embodiment of the present disclosure may generate an optimal transmission rate for minimizing the time delay between the transmitting node and the receiving node by an average value of the transmission rate.

Figure 7:
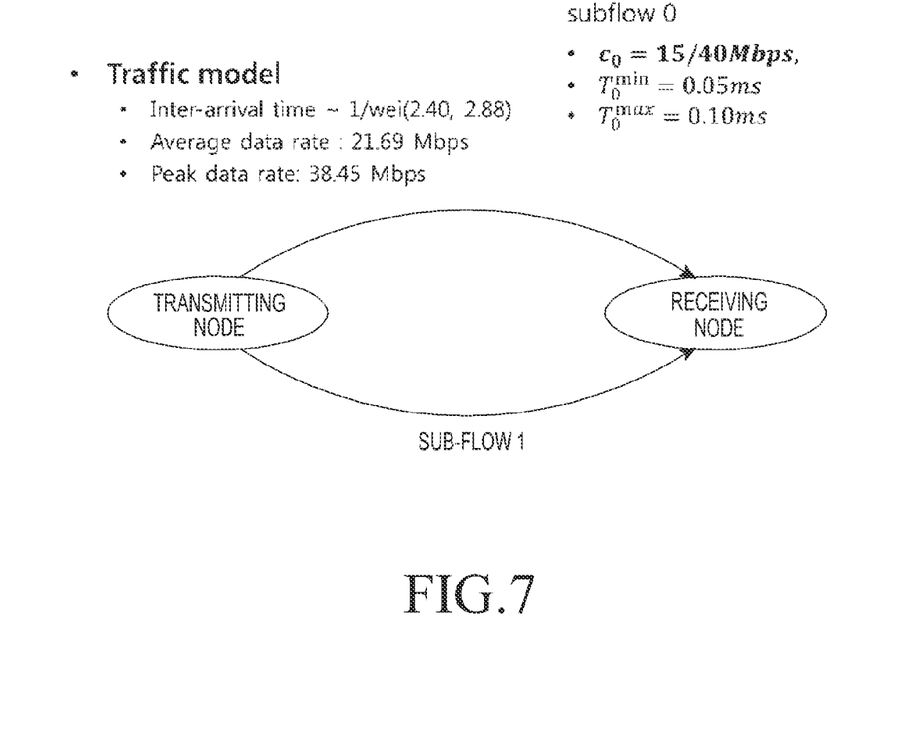
FIG. 7 illustrates an example of a communication environment to which a data flow control method according to an embodiment of the present disclosure is applicable.
Figure 8:
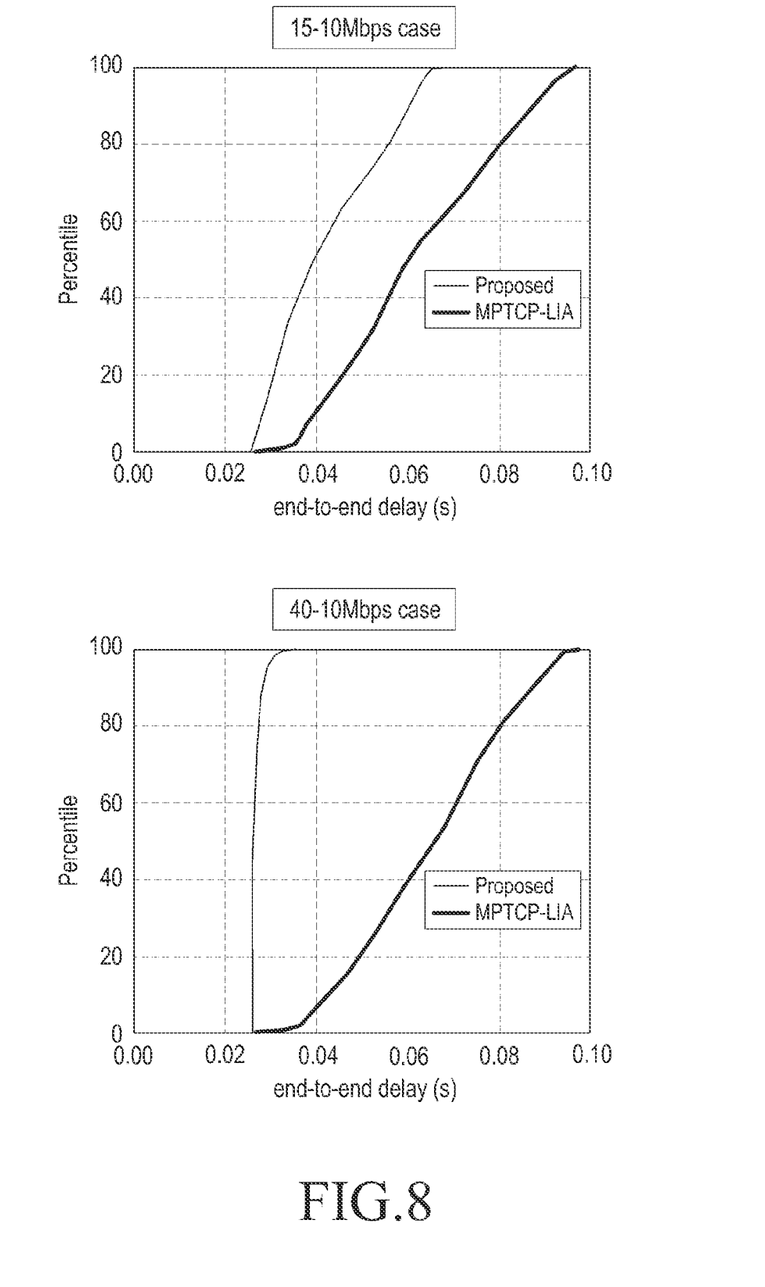
FIG. 8 illustrates a comparison between the conventional network time delay and the network time delay according to an embodiment of the present disclosure in the communication environment of FIG. 7.

FIG. 7 illustrates an example of a communication environment to which a data flow control method according to an embodiment of the present disclosure is applicable, and FIG. 8 illustrates a comparison between the conventional network time delay and the network time delay according to an embodiment of the present disclosure in the communication environment of FIG. 7. wei($\alpha,\beta$) means Weibull distribution, in which alpha is shape parameter and beta is scale parameter (https://en.wikipedia.org/wiki/Weibull_distribution)

In the communication environment shown in FIG. 7, it will be assumed that in the communication system, when two sub-flows exist between a transmitting node and a receiving node, a sum of the capacities of the two sub-flows is greater than the traffic rate, and the capacity of one of the two sub-flows is too low, causing an excessive queuing delay. As shown in FIG. 8, it can be seen that in both of a case where the capacity is 15-10 Mbps and a case where the capacity is 40-10 Mbps, an embodiment of the present disclosure has a lower delay distribution than the prior art. In particular, it can be seen that in the case where the capacity is 40-10 Mbps, since the sum of the capacities is large enough compared with the traffic rate, only the minimum network delay occurs.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. An apparatus for controlling a data flow in a receiving node of a communication system, the apparatus comprising:
   a transceiver configured to transmit or receive data;
   a controller configured to:
      control to receive the data for a specific sub flow among a plurality of sub-flows,
      calculate an optimal transmission rate of the received data,
      determine a window reference value corresponding to the optimal transmission rate,
      generate a duplicated acknowledge message if a window size for the specific sub-flow is greater than or equal to the window reference value, and
      transmit the duplicated acknowledge message to a transmitting node,
   wherein the optimal transmission rate is calculated based on a transmission rate of an application layer of the transmitting node and a capacity for the specific sub-flow.

2. The apparatus of claim 1, wherein the optimal transmission rate is calculated based on the transmission rate of the application layer of the transmitting node and path information for the specific sub-flow.

3. The apparatus of claim 2, wherein the path information for the specific sub-flow includes information about at least one of a round trip time (RTT), a packet loss rate, a window, the capacity and a bandwidth-delay product for the specific sub-flow.

4. The apparatus of claim 3, wherein the RTT and the packet loss rate are estimated based on data transmission/reception time between the transmitting node and the receiving node and the number of transmitted/received data packets for the specific sub-flow, the window, and the capacity and the bandwidth-delay product are estimated based on the RTT and the packet loss rate.

5. The apparatus of claim 4, wherein the optimal transmission rate is calculated based on a function between the transmission rate of an application layer of the transmitting node and the capacity.

6. The apparatus of claim 5, wherein the optimal transmission rate is calculated based on equation below, $$x_r^* = \mathrm{argmin}_{r \in R_s}\left[\left(\frac{1}{\Sigma \hat{x}_r - m_f}\right)\left(\frac{1+(\sigma_f/m_f)^2}{2}\right) + \max_{r \in R_s} \frac{c_r T_r^p}{c_r - \hat{x}_r}\right],$$

wherein the $R_s$ is a set for a plurality of sub-flows, the $\hat{x}_r$ is a transmission rate for the specific sub-flow, the $T_r^p$ is a minimum RTT for the specific sub-flow, the f is the transmission rate of an application layer of the transmitting node, the $\sigma_f$ is a standard deviation of an inter-arrival time and the $m_f$ is an average of the inter-arrival time, the $c_r$ is the capacity for the specific sub-flow, the r is the specific sub-flow.

7. The apparatus of claim 1, wherein the window reference value is determined based on a window size for an optimal packet loss rate that is applied to the optimal transmission rate.

8. The apparatus of claim 1, wherein the controller generates an acknowledge message if the window size for the specific sub-flow is less than the window reference value.

9. The apparatus of claim 8, wherein the transmitter transmits the acknowledge message to the transmitting node.

10. A method for controlling a data flow in a receiving node of a communication system, the method comprising:
    receiving data for a specific sub flow among a plurality of sub-flows;
    calculating an optimal transmission rate of the received data, determining a window reference value corresponding to the optimal transmission rate, and generating a duplicated acknowledge message if a window size for the specific sub-flow is greater than or equal to the window reference value; and
    transmitting the duplicated acknowledge message to a transmitting node,
    wherein the optimal transmission rate is calculated based on a transmission rate of an application layer of the transmitting node and a capacity for the specific sub-flow.

11. The method of claim 10, wherein the optimal transmission rate is calculated based on the transmission rate of the application layer of the transmitting node and path information for the specific sub-flow.

12. The method of claim 11, wherein the path information for the specific sub-flow includes information about at least one of a round trip time (RTT), a packet loss rate, a window, the capacity and a bandwidth-delay product for the specific sub-flow.

13. The method of claim 12, wherein the RTT and the packet loss rate are estimated based on data transmission/reception time between the transmitting node and the receiving node and the number of transmitted/received data packets for the specific sub-flow, the window, and the capacity and the bandwidth-delay product are estimated based on the RTT and the packet loss rate.

14. The method of claim 13, wherein the optimal transmission rate is calculated based on a function between the transmission rate of an application layer of the transmitting node and the capacity.

15. The method of claim 14, wherein the optimal transmission rate is calculated based on equation below, $$x_r^* = \operatorname{argmin}_{r \in R_s} \left[ \left( \frac{1}{\Sigma \hat{x}_r - m_f} \right) \left( \frac{1 + (\sigma_f/m_f)^2}{2} \right) + \max_{r \in R_s} \frac{c_r T_r^p}{c_r - \hat{x}_r} \right],$$

wherein the $R_s$ is a set for a plurality of sub-flows, the $\hat{x}_r$ is a transmission rate for the specific sub-flow, the $T_r^p$ is a minimum RTT for the specific sub-flow, the f is the transmission rate of an application layer of the transmitting node, the $\sigma_f$ is a standard deviation of an inter-arrival time and the $m_f$ is an average of the inter-arrival time, the $c_r$ is the capacity for the specific sub-flow, the r is the specific sub-flow.

16. The method of claim 10, wherein the window reference value is determined based on a window size for an optimal packet loss rate that is applied to the optimal transmission rate.

17. The method of claim 10, further comprising generating an acknowledge message if the window size for the specific sub-flow is less than the window reference value.

18. The method of claim 10, further comprising transmitting the acknowledge message to the transmitting node.

* * * * *

UNITED STATES PATENT AND TRADEMARK OFFICE
CERTIFICATE OF CORRECTION

PATENT NO. : 10,057,147 B2  
APPLICATION NO. : 14/866593  
DATED : August 21, 2018  
INVENTOR(S) : Se-Yong Park et al.

Page 1 of 1

It is certified that error appears in the above-identified patent and that said Letters Patent is hereby corrected as shown below:

On the Title Page

In Item (73), under "ASSIGNEE," please correct the Assignee names to read:
--Samsung Electronics Co., Ltd. (KR)
Seoul National University R&DB Foundation (KR)--.

Signed and Sealed this
Seventeenth Day of September, 2019

Andrei Iancu
*Director of the United States Patent and Trademark Office*